(12) United States Patent
Chu

(10) Patent No.: US 7,743,791 B2
(45) Date of Patent: Jun. 29, 2010

(54) AIR CONTROL MODULE UNIT FOR PORTABLE PNEUMATIC TOOL

(75) Inventor: George Chu, Chungli (TW)

(73) Assignee: China Pneumatic Corporation, Chungli (TW)

( * ) Notice: Subject to any disclaimer, the term of this patent is extended or adjusted under 35 U.S.C. 154(b) by 687 days.

(21) Appl. No.: 11/739,724

(22) Filed: Apr. 25, 2007

(65) Prior Publication Data

US 2008/0264507 A1    Oct. 30, 2008

(51) Int. Cl.
*F16K 11/20* (2006.01)

(52) U.S. Cl. .............................. 137/885; 251/41; 91/51; 91/461; 173/169

(58) Field of Classification Search ................. 137/883, 137/884, 885; 251/41; 173/169; 91/51, 91/461

See application file for complete search history.

(56) References Cited

U.S. PATENT DOCUMENTS 3,674,041 A * 7/1972 Beals ............................ 91/51
3,811,514 A * 5/1974 Blomberg et al. ........... 137/885
4,776,561 A * 10/1988 Braunlich et al. ............. 91/461

* cited by examiner

*Primary Examiner*—John Fox

(57) ABSTRACT

The present invention generally relates to an air control module unit for a portable pneumatic tool, more particularly, to an air control module unit that actuates a valve stem inside an air inlet block of the air inlet module by a correspondent air bleed valve in the air actuation module. The air control module unit for a portable pneumatic tool comprising: an air inlet module, which has at least one valve stem inside an air inlet block, the air inlet block having plug screws on both ends towards the valve stem and one plug screw on the intersectional direction of the valve stem with at least one air inlet port opening for hooking up the compressed air; an air actuation module having a bleed valve inside the valve block; a plurality of flexible air hoses with a plurality of dimensions and being prepared for connecting the air inlet module and air actuation module; and a plurality of hose connectors and rubber seats with a plurality of types for connecting the air inlet module and the air operation module.

7 Claims, 19 Drawing Sheets

AIR CONTROL MODULE UNIT FOR PORTABLE PNEUMATIC TOOL

BACKGROUND OF THE INVENTION

1. Field of the Invention

The present invention generally relates to an air control module unit for portable pneumatic tools, more particularly, to an air control module unit that actuates a valve stem inside an air inlet block of an air inlet module by an air bleed valve in an air actuation module.

2. Description of the Prior Art

The prior art "Portable Pneumatic Tool assembled with Module Units" U.S. Pat. No. 6,149,356, with the concept to divide the portable pneumatic tools in basically four modules, i.e. air inlet module, air actuation module, air directional module, and air operation module, which are connected by air hoses in between, then, installed inside the clam shell housings, as shown in FIG. 12 and FIG. 13. The housings can be two symmetric half shells (clam shell) or several partially cutaway shells made of sheet metal forming or composite material injection molding. It has the benefits to build the portable pneumatic tools economically and pursues to apply this invention to build the tool more flexible and ergonomic.

As shown in FIG. 14, which is a sectional drawing showing an air actuation valve of the prior art, and the air actuation valve 3 consists of a valve block 31, a valve stem 32, two hose connectors 33, one spring 35, and one plug screw 34, in order to allow sufficient flow of compressed air passing by and enter the operation module, the prior art cannot be minimized to ideal compact dimensions to meet the satisfaction and comfort of the hand held housing design.

However, while applying the up-mentioned prior art to build portable pneumatic tools, especially pistol grip type of air tools, the inventor has found the drawbacks thereof.

Since the air passage of the prior art should be big enough to allow sufficient compressed air go through while keeping the hand held portion of the housing to fit the palm grip comfortably, but all efforts have been done in vain while installing the air actuation module into the hand grip portion of the half shell housings, the inventor has then developed and invented the present new air control module unit to actuate the valve stem inside the air inlet block of the air inlet module remotely by air bleed valve in the air actuation module. The air actuation module is functioned by air bleed valve and correspondent air bleed hose which are all in miniature dimensions. The air inlet module and air actuation module are separated and connected remotely by air hoses in between. This mechanism will make the hand held portion retains only the air actuation module, air bleed hose, and air hoses for leading the compressed air to the operation module and easy to make the half shell housings fit the palm grip ergonomically. It will not only provide the great interchangeability of the air control module units for most of portable pneumatic tools to reduce production and inventory cost and making tool service and assembly faster and easier, but also allow more versatility for assembling with additional electro-mechanical devices and sensors with digital displays, etc. for various requirements of functions and applications.

Therefore the inventor has developed the new structure of the air control module unit to solve the problems mentioned above and will be described as follows.

SUMMARY OF THE INVENTION

The object of the present invention is to provide a new air control module unit to take the place of the previous air inlet module and air actuation module design, which was originally developed to be assembled and connected with an air operation module by air hoses installed inside symmetrical half shells or partially cut-away shells.

The present invention is to provide the pneumatic tool or equipment with one or several pairs of air control module unit for introducing the compressed air to the air operation module. Each air control module unit is to composed of an air inlet module, an air actuation module, and air hoses made with different dimensions or materials (depending on the working air pressure and air flow rate required for the air tool). The air inlet module can be designed with single, dual, or multiple valve stems inside an air inlet block and parallel aligned. Each valve stem will be actuated by correspondent air bleed valve in the air actuation module and connected by miniature air bleed hoses in between. As soon as the air bleed valve actuated by pressing a button or trigger, the valve stem inside the air inlet block will be forced to move till against the plug screw while allowing the compressed air get into the air operation module directly or through another air directional valve indirectly to run the tool immediately. All modules are connected by air hoses with proper hose connectors or elastomer made seals as an assembly and installed into the corresponding cavities in the half shell housings. All air hoses are designed to be clamped by inner semicircle ribs of the half shell housings securely.

Except the original benefits of the prior art, such as light tool weight, versatile material selection for tool housing, lower production and inventory cost, easy for assembly and tool maintenance, the air control module unit of the present invention provides not only the great interchangeability of the air control modules units among most of portable pneumatic tools to further reduce production and inventory cost, but also more room inside the housings to allow the versatility for installing additional electro or electro-mechanical devices and sensors with digital display or even a set of detachable LED light and battery cassette for lightening, etc. for various requirements of functions and applications.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numeral parts are throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

An air control module unit for a portable pneumatic tool comprising: an air inlet module, which has at least one valve stem inside an air inlet block, the air inlet block having plug screws on both ends towards the valve stem and one plug screw on the opposite end of the air inlet port for seating, wherein the air inlet port is for connecting the compressed air. The air inlet block can be built with the valve stem parallel aligned inside the air inlet block and all air inlet or outlet holes around the valve stem in any intersectional direction depends upon the requirement of structure design; an air actuation module having a bleed valve inside a valve block; a plurality of flexible air hoses with a plurality of dimensions and being prepared for connecting the air inlet module and the air actuation module; and a plurality of hose connectors and rubber seats with a plurality of types being designed for options in use; wherein said air inlet module can be built with every inlet and outlet holes around the air inlet block at the intersectional direction of the valve stem.

Figure 1:
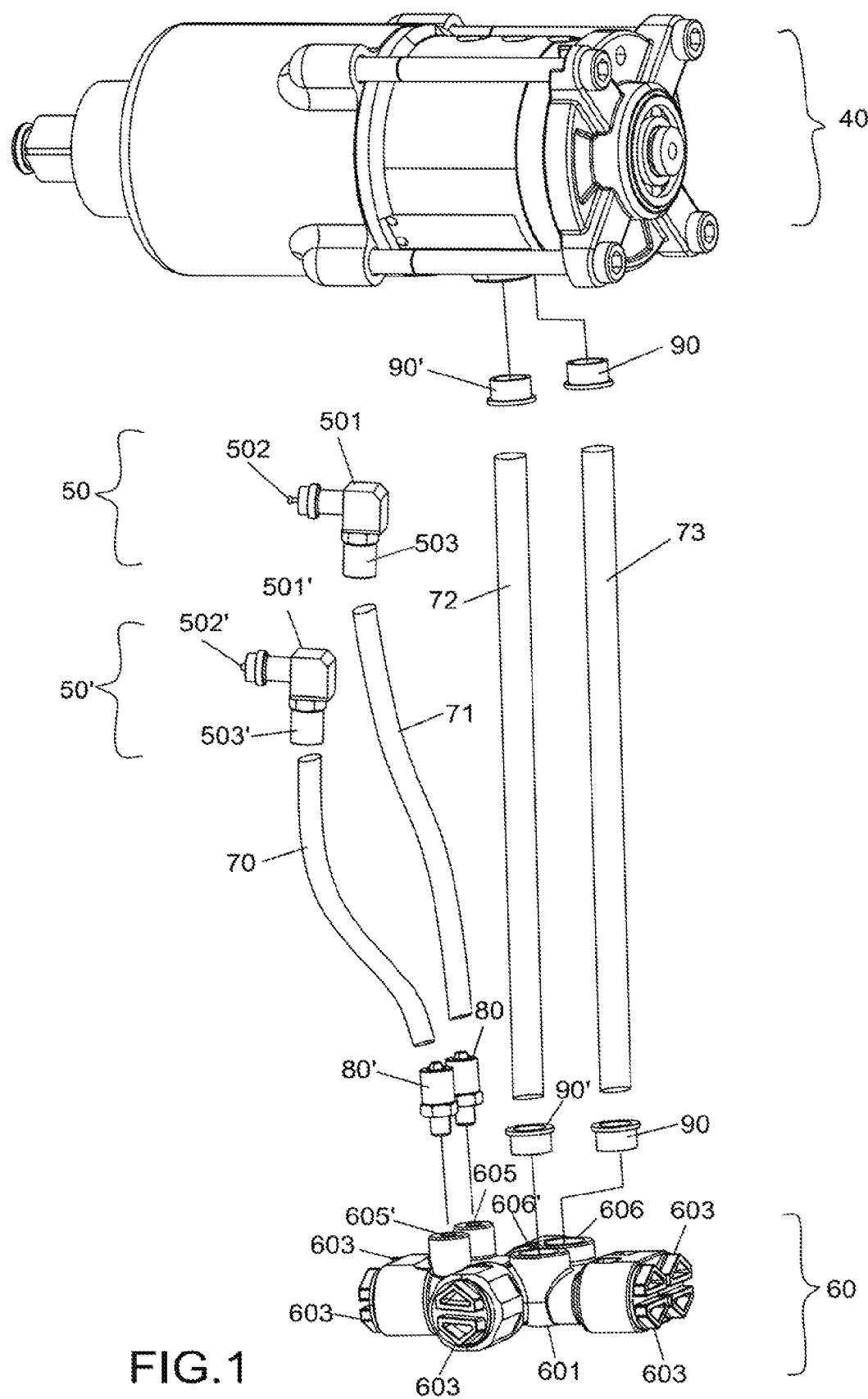
FIG. 1 illustrates a schematic exploded view of a first preferred embodiment of an air control module unit of a pneumatic tool of the present invention.
Figure 2:
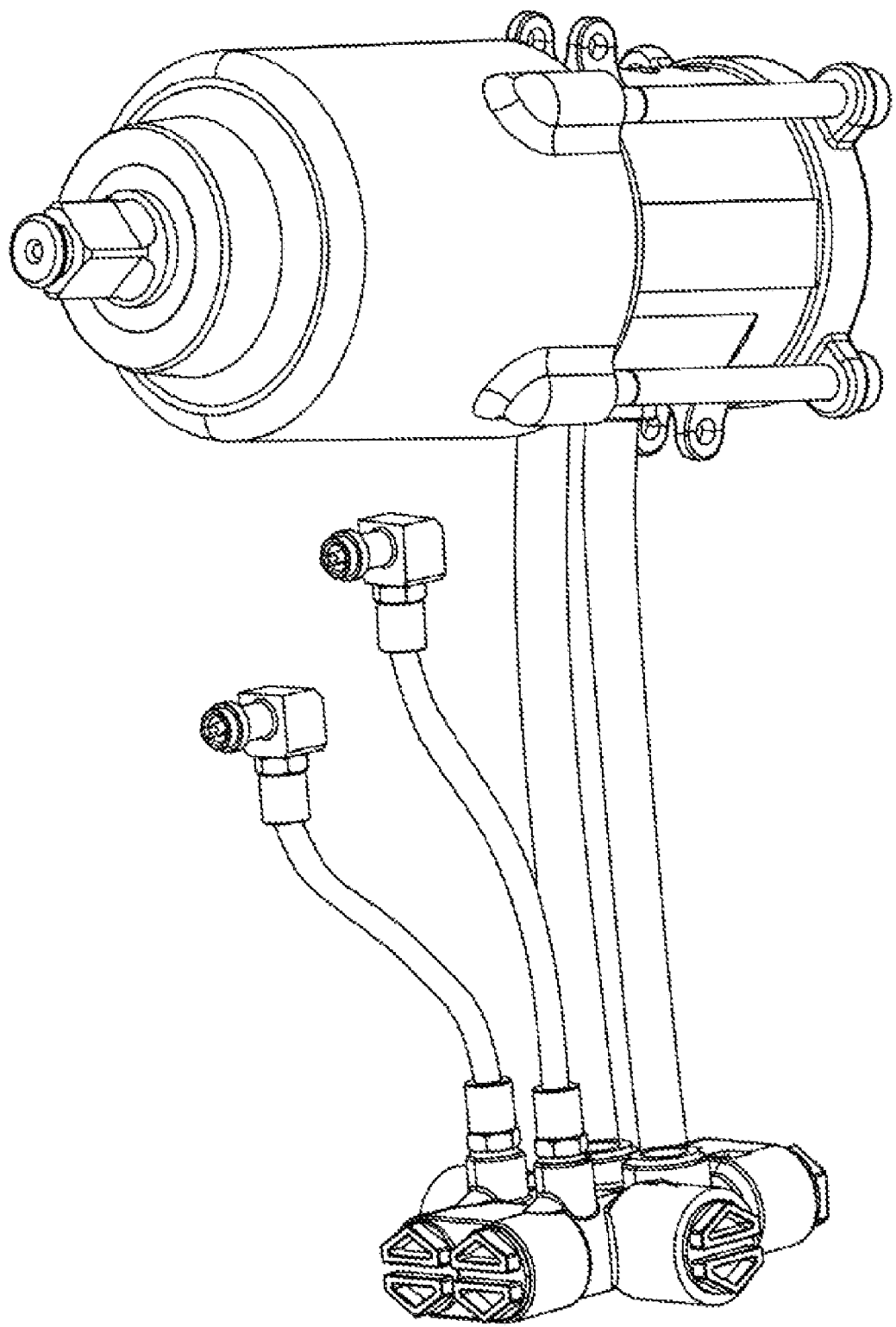
FIG. 2 illustrates a schematic assembled view of the first preferred embodiment of the air control module unit of a pneumatic tool of the present invention.
Figure 5:
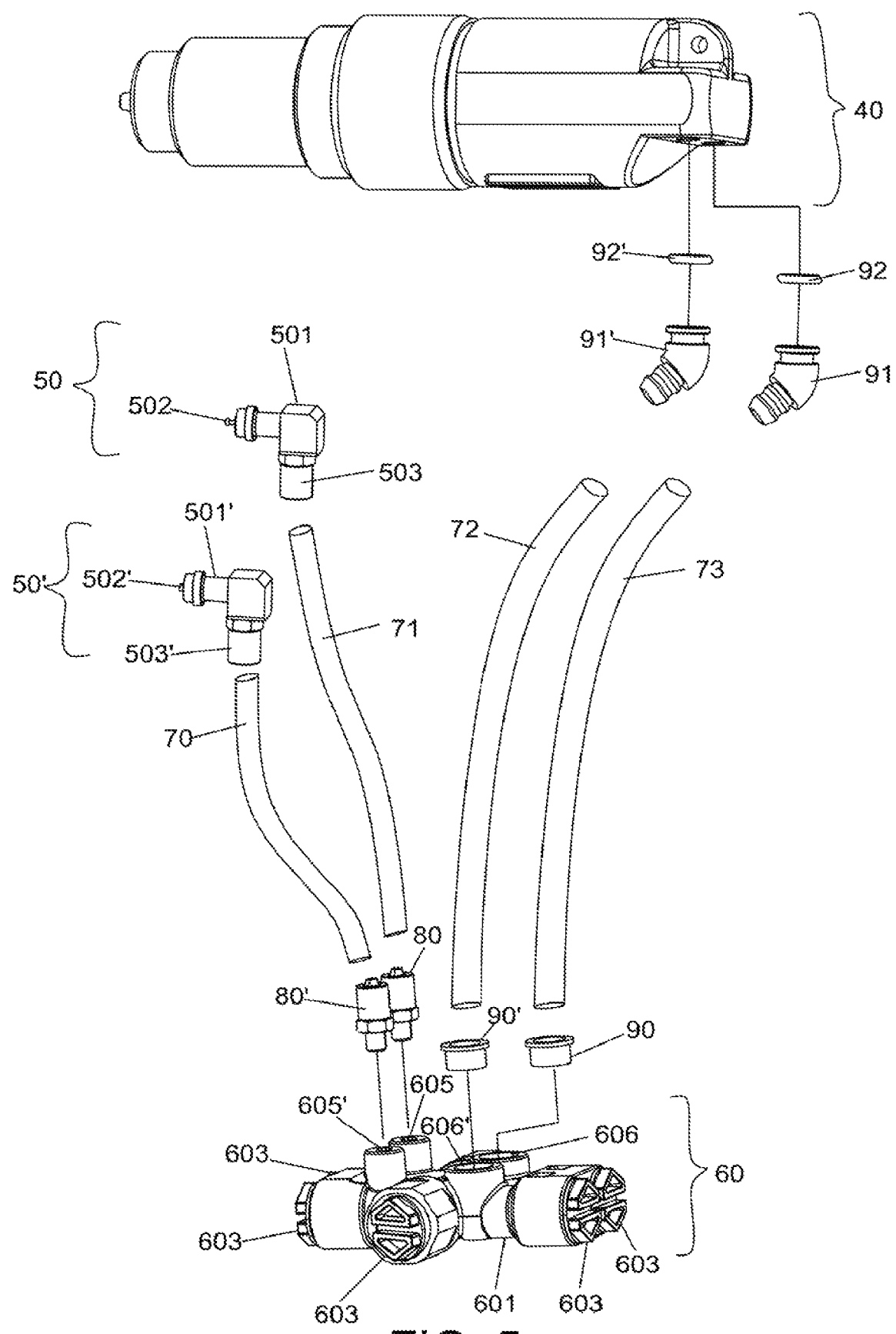
FIG. 5 illustrates a schematic exploded view of a third preferred embodiment of the air control module unit of a pneumatic tool of the present invention.
Figure 6:
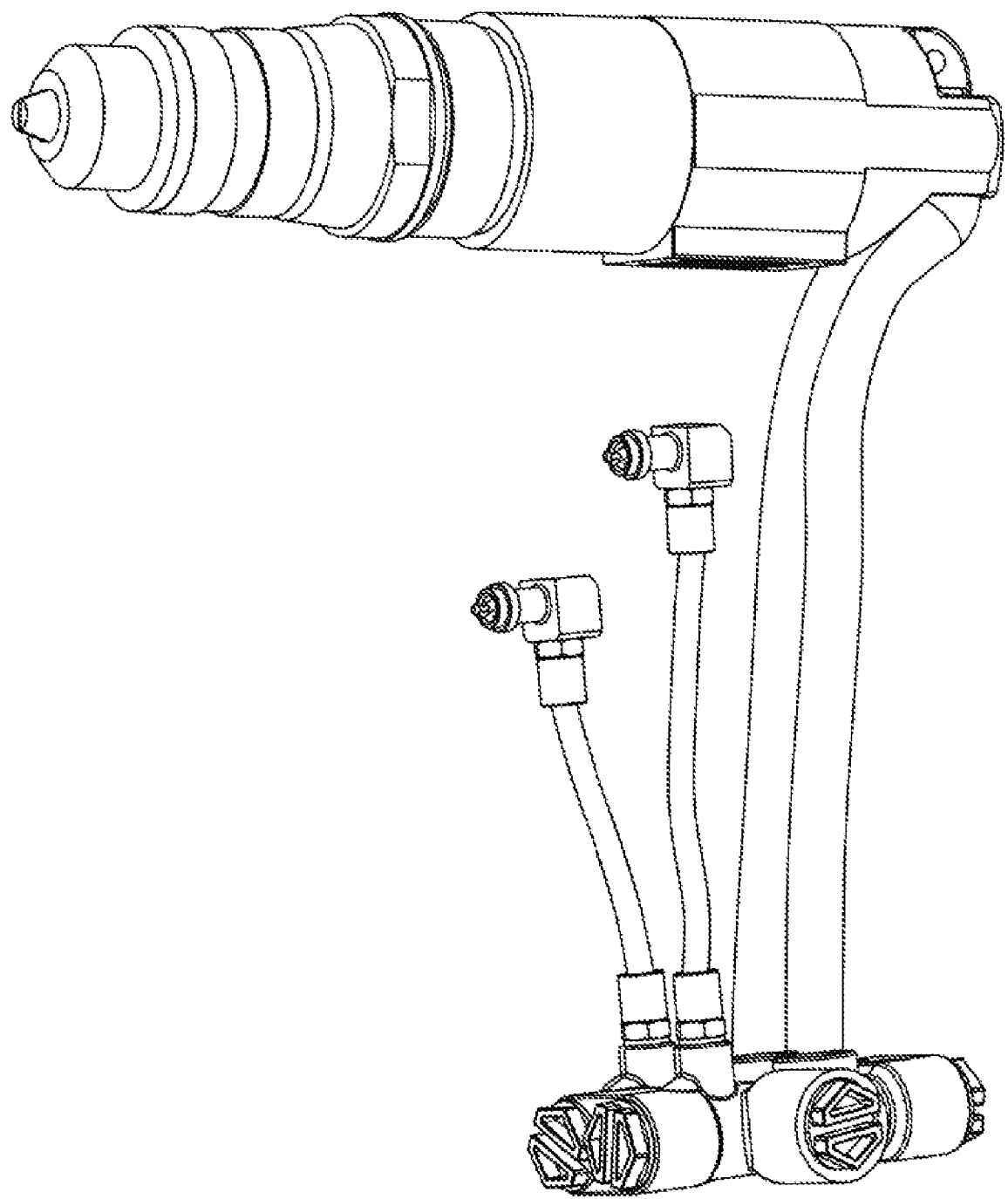
FIG. 6 illustrates a schematic assembled view of the third preferred embodiment of the air control module unit of a pneumatic tool of the present invention.

Referring to FIG. 1 and FIG. 5, which illustrate a schematic exploded view of a first preferred embodiment of an air control module unit of a pneumatic tool of the present invention and a schematic exploded view of a third preferred embodiment of the air control module unit of a pneumatic tool of the present invention; FIG. 2 and FIG. 6 illustrate a schematic assembled view of the first preferred embodiment of the air control module unit of the pneumatic tool of the present invention and a schematic assembled view of the third preferred embodiment of the air control module unit of a pneumatic tool of the present invention, and each preferred embodiment comprises two air actuation module 50 and 50', which are the same as each other, and one air inlet module 60 connected to hose connectors 80, 503, and 80', 503' by air bleed hoses 71 and 70.

The air actuation module 50 and 50' are the same and interchangeable. Each module composes a valve block 501 or 501', an air bleed valves 502 or 502' and the hose connectors 503 or 503', which are the same as each other and to be connected to correspondent air bleed outlets 605 or 605' on an air inlet block 601 of the air inlet module 60.

Figure 15:
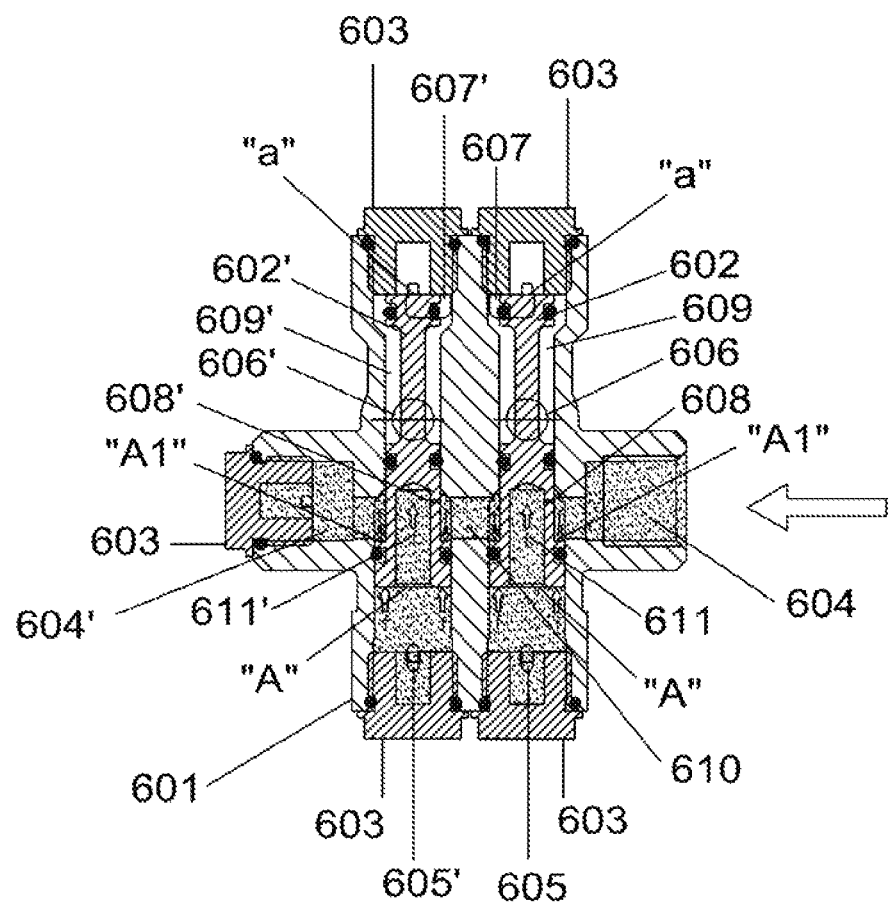
FIG. 15 is a sectional drawing of an air inlet module with dual valve stem inside the air inlet block of the present design, showing the location of the valve stem in the air inlet block under static condition while the air inlet port of the air inlet block hooked up to the compressed air.

Please refer to FIG. 15 simultaneously, the air inlet module 60 has the air inlet block 601, two valve stems 602 and 602', which are the same as each other and actuated by the correspondent air actuation module 50 or 50' respectively and moved back and forth inside the bore of the air inlet block 601; five plug screws 603 corresponding to plug five threaded holes on the air inlet block 601; two hose connectors 80 and 80', as shown in FIG. 1 and FIG. 5, on the air bleed hole 605 and 605'; and two elastomeric seats 90 and 90' which can be made of rubber, as shown in FIG. 1 and FIG. 5, on two main air outlet hole 606 and 606'.

As shown in FIG. 1 and FIG. 5, the hose connectors 80 and 80' have correspondent air bleed hoses 71 and 70 connected to the correspondent hose connectors 503 and 503' on the air actuation module 50 and 50' respectively while the elastomeric seats 90 and 90' being inserted into the main air outlet holes 606 and 606' on the air inlet block 601 with air hoses 73 and 72 to the designated air port on an operation module 40 for forward or reverse rotation. There will be correspondent recess holes on the operation module 40 for inserting two elastomeric seats 90 and 90' to connect to the air hoses 73 and 72. This air inlet module 60 is defined as a dual air inlet module with two valve stems 602 and 602', as shown in FIG. 15, for dual directional motion control.

Figure 3:
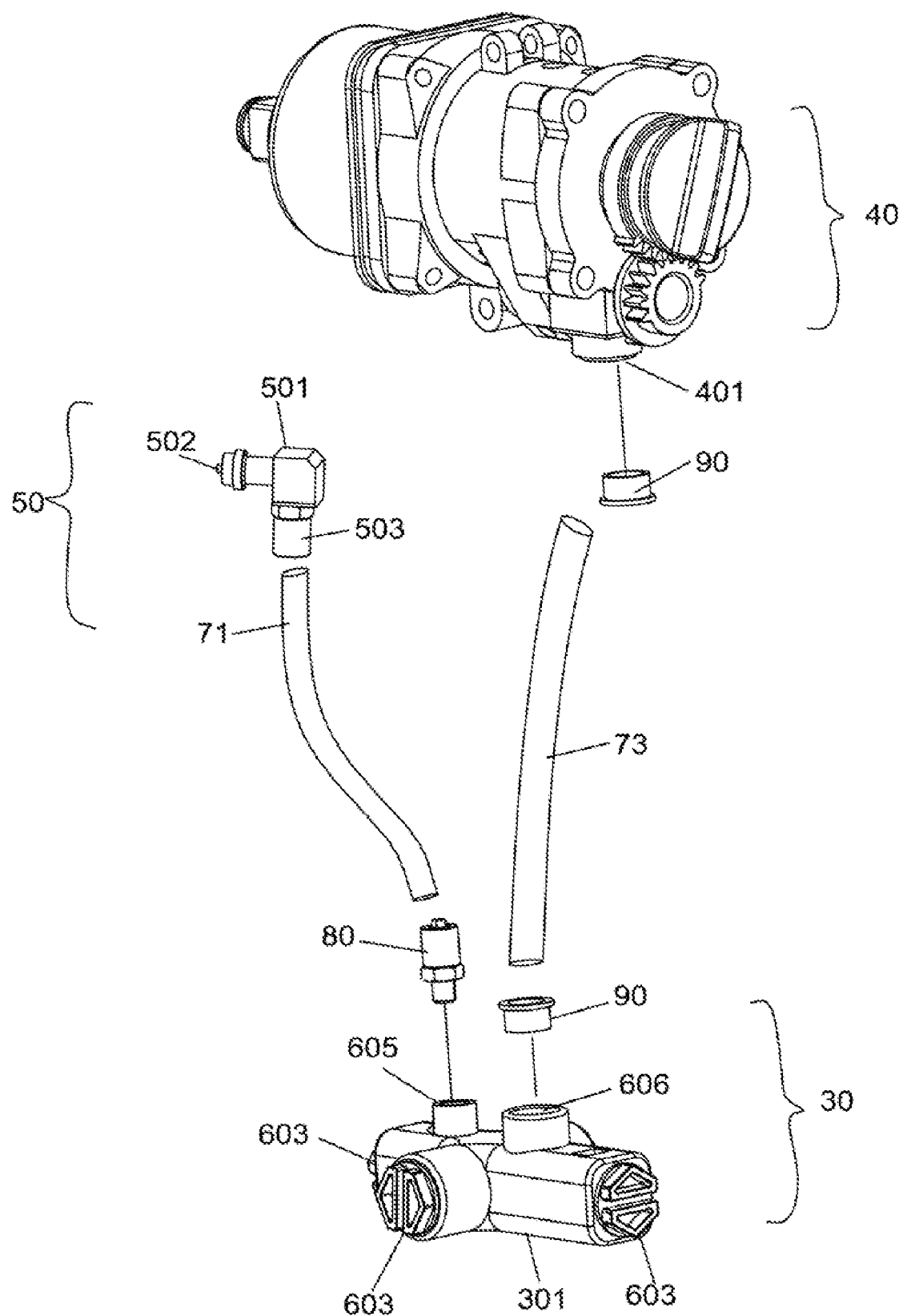
FIG. 3 illustrates a schematic exploded view of a second preferred embodiment of the air control module unit of a pneumatic tool of the present invention.
Figure 4:
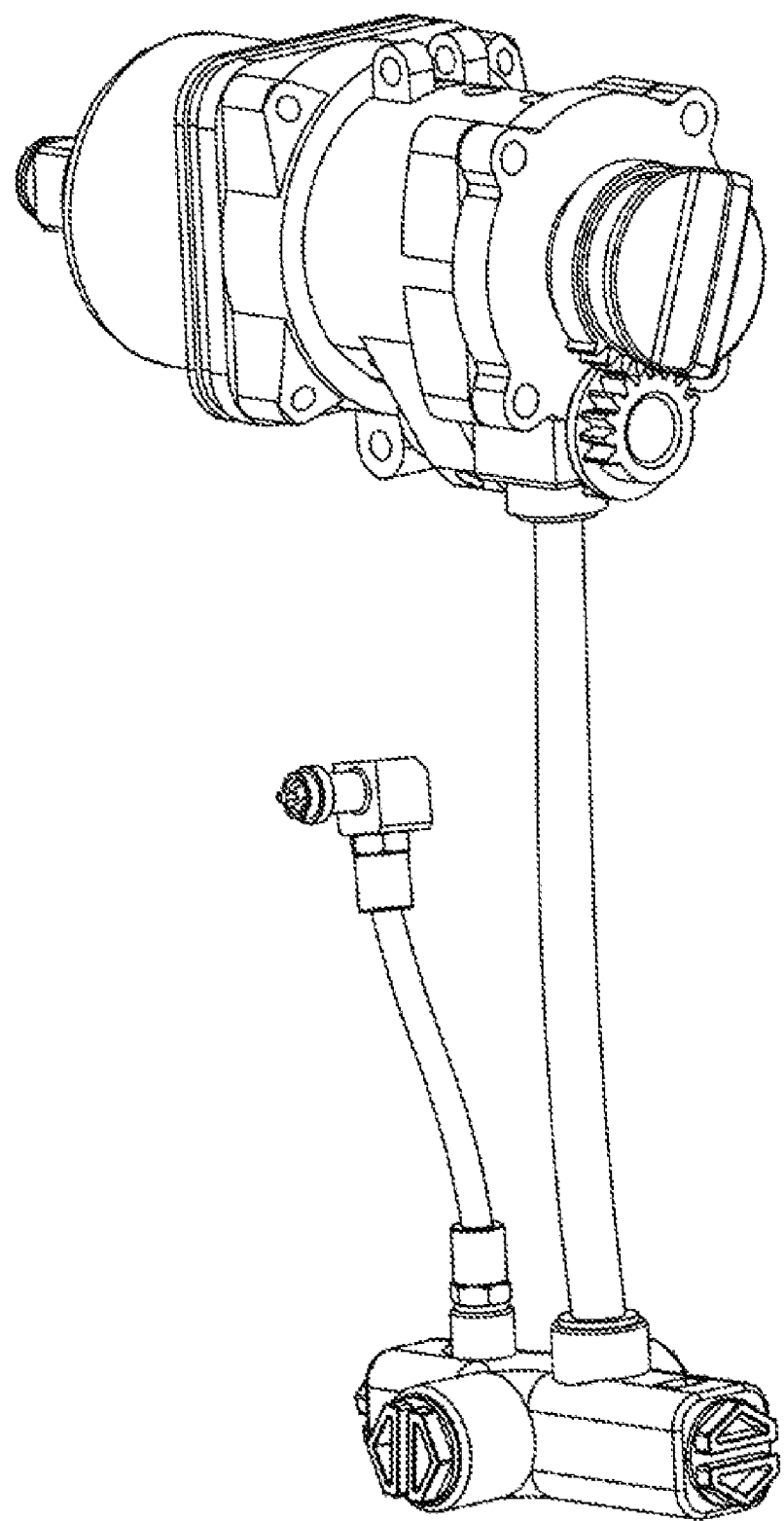
FIG. 4 illustrates a schematic assembled view of the second preferred embodiment of the air control module unit of a pneumatic tool of the present invention.

Referring to FIGS. 3 and 4, which illustrate a schematic exploded view of a second preferred embodiment of the air control module unit of the pneumatic tool of the present invention and a schematic assembled view of the second preferred embodiment of the air control module unit of the pneumatic tool of the present invention and comprises: the air actuation module 50 having the same components as the one in FIG. 1 and FIG. 5; the air inlet module 30 having an air inlet block 301; single valve stem, which is the same as the valve stem 602 in FIG. 15, not shown in FIGS. 3 and 4, but shown in FIG. 16, FIG. 17, FIG. 19, FIG. 20, and FIG. 21 actuated by the air actuation module 50 and moved back and forth inside the bore of the air inlet block 301; three plug screws 603 plugged into the threaded holes on the air inlet block 301; the hose connector 80 to be screwed into the holes 605; and the elastomeric seats 90 to be inserted into the hole 606. The hose connector 80 has the air bleed hose 71 connected to the air actuation module 50 while the elastomeric seats 90 being inserted into a recess hole 606 on the air inlet block 301 and connected to the air hose 73 to lead compressed air to the air port 401 on the operation module 40. The air port 401 on the operation module 40 is a recess hole for accommodating the elastomeric seats 90 in order to connect to the air hose 73. This air inlet module 30 is defined as a single air inlet module with only one valve stem 602 for one-way motion control.

Referring to FIG. 5 and FIG. 6, which illustrate the schematic exploded view of the third preferred embodiment of the air control module unit of the pneumatic tool of the present invention and the schematic assembled view of the third preferred embodiment of the air control module unit of the pneumatic tool of the present invention. The air control module unit 50 and 50' with the dual air inlet module 60 can be applied to a reversible air drill, which should be able to rotate clockwise or counterclockwise.

Figure 7:
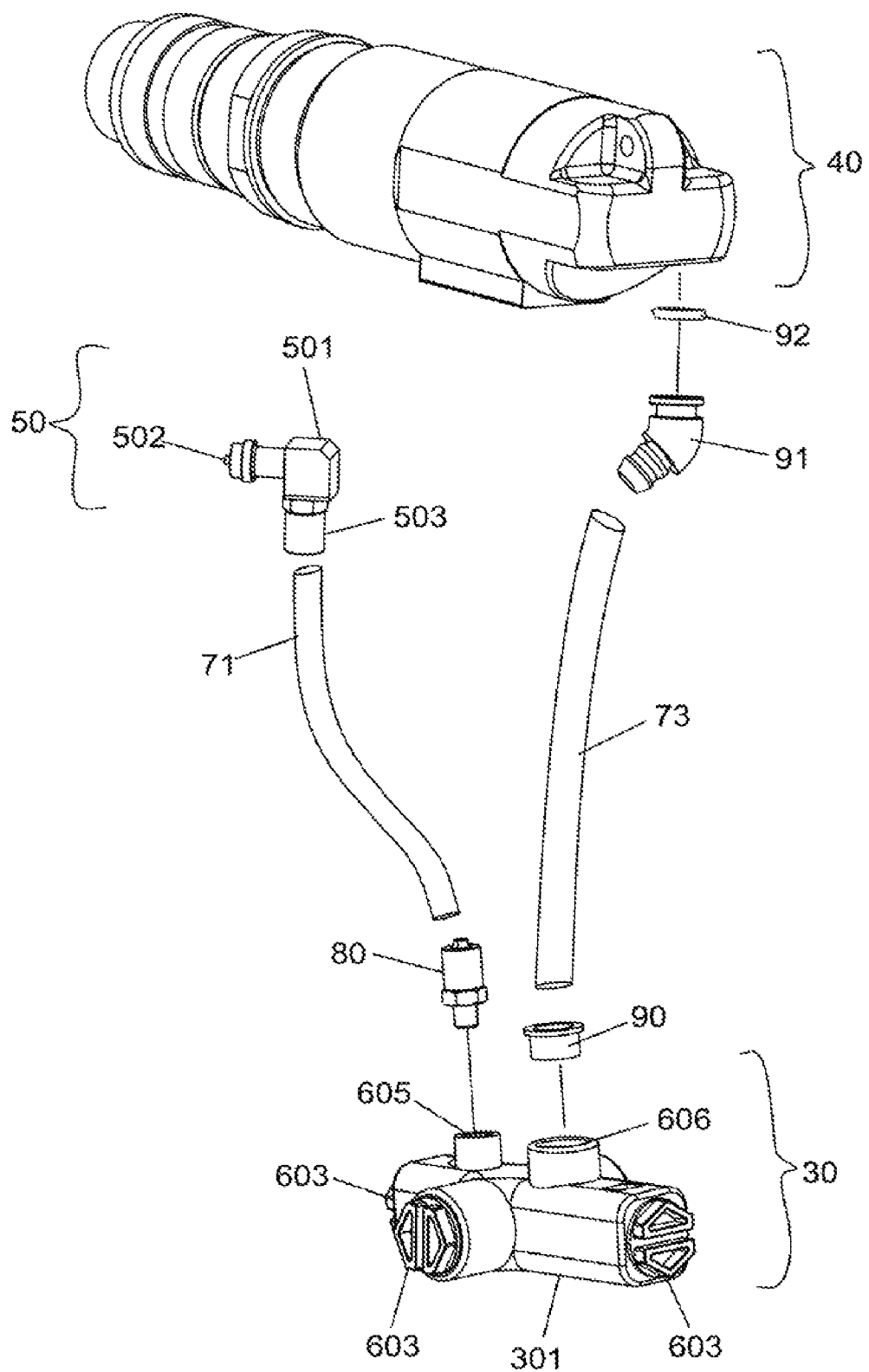
FIG. 7 illustrates a schematic exploded view of a fourth preferred embodiment of the air control module unit of a pneumatic tool of the present invention.
Figure 8:
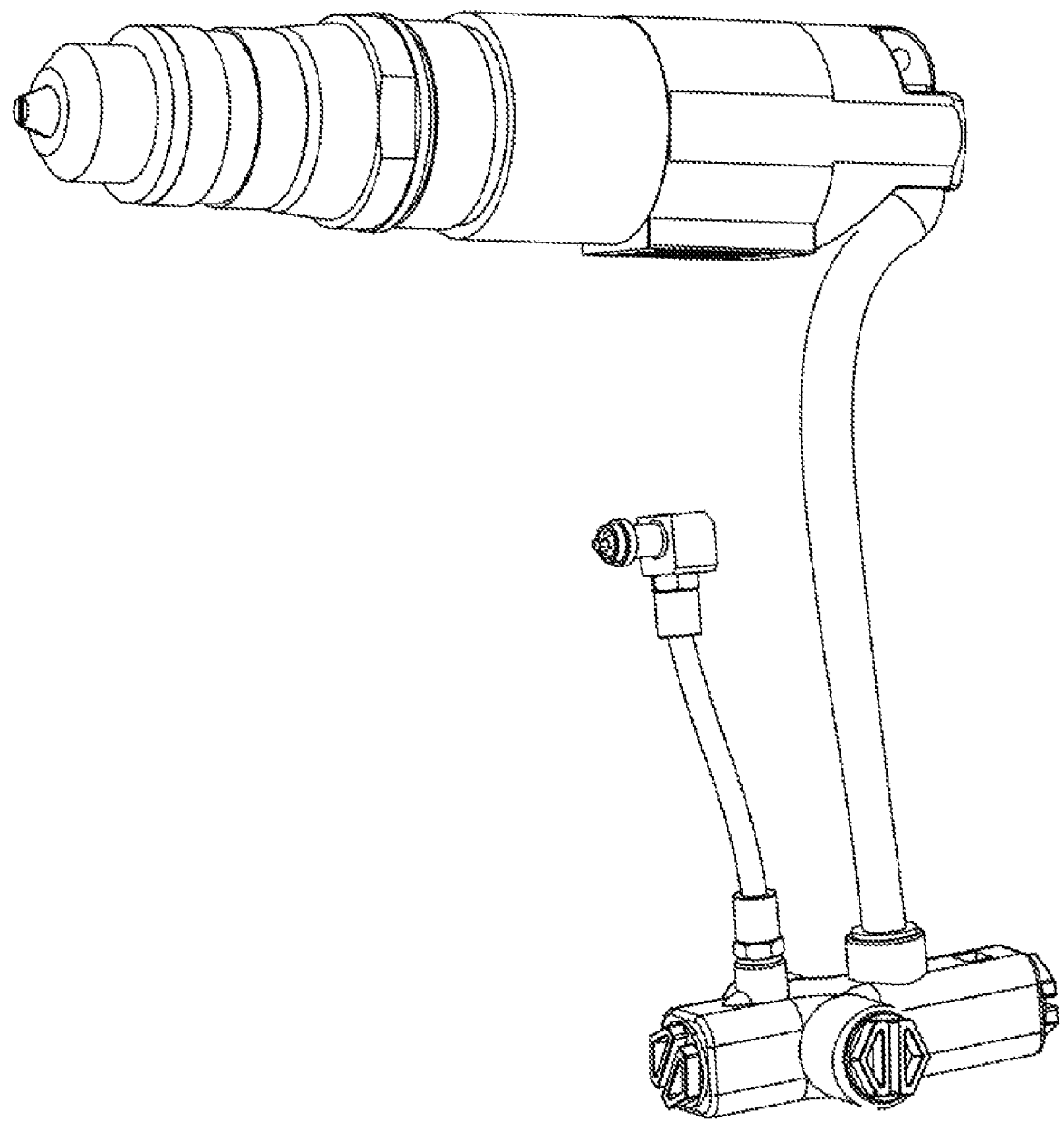
FIG. 8 illustrates a schematic assembled view of the fourth preferred is embodiment of the air control module unit of a pneumatic tool of the present invention.
Figure 9:
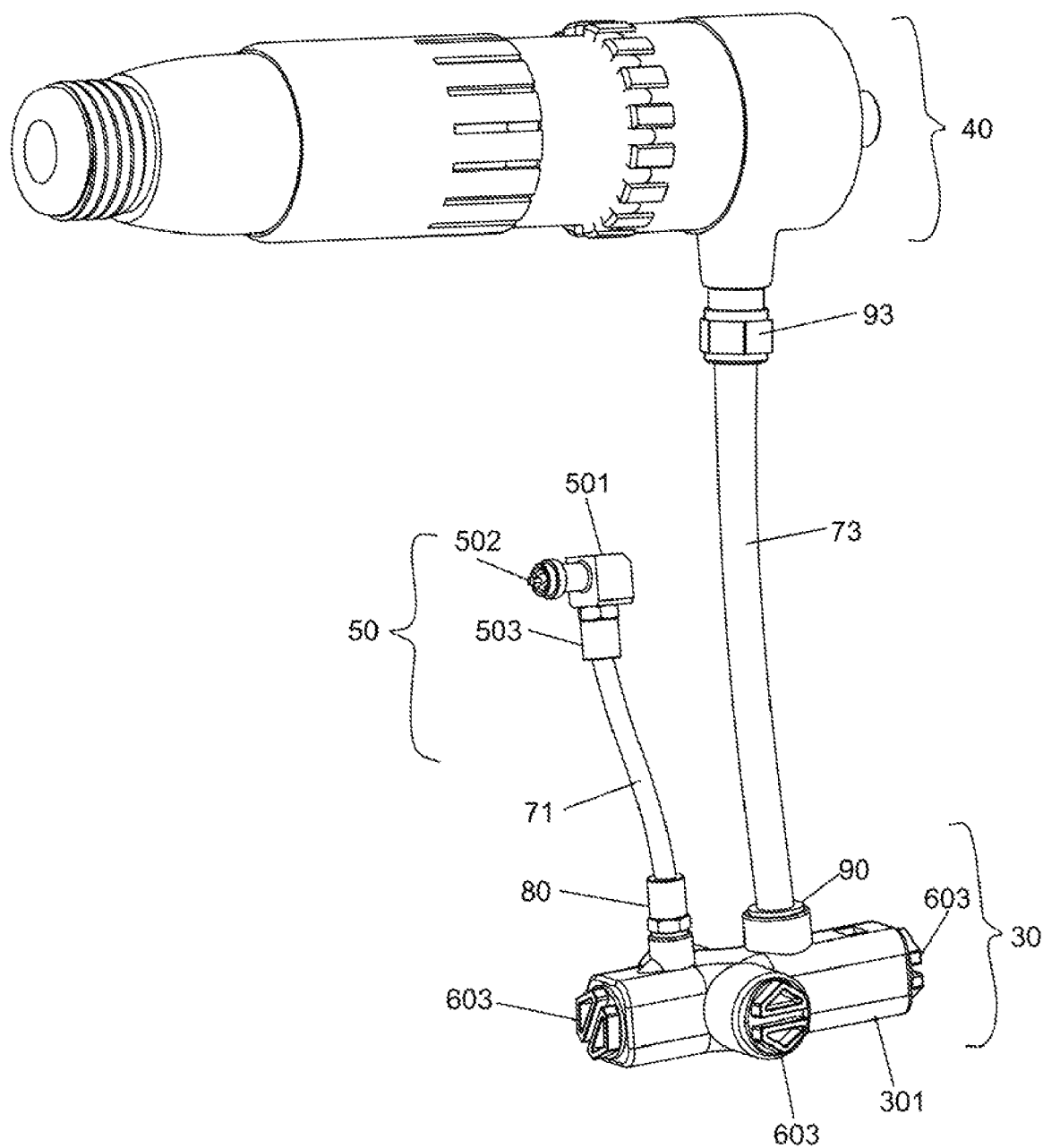
FIG. 9 illustrates a schematic assembled view of a fifth preferred embodiment of the air control module unit of a pneumatic tool of the present invention.

Referring to FIG. 7, FIG. 8, and FIG. 9, which illustrate a schematic exploded view of a fourth preferred embodiment of the air control module unit of the pneumatic tool of the present invention, a schematic assembled view of the fourth preferred embodiment of the air control module unit of the pneumatic tool of the present invention, and a schematic assembled view of a fifth preferred embodiment of the air control module unit of the pneumatic tool of the present invention. The two preferred embodiments are to extend the usages of the air control module unit in a manner of a non-reversible air drill and an air hammer with one way rotation or reciprocation.

Figure 10:
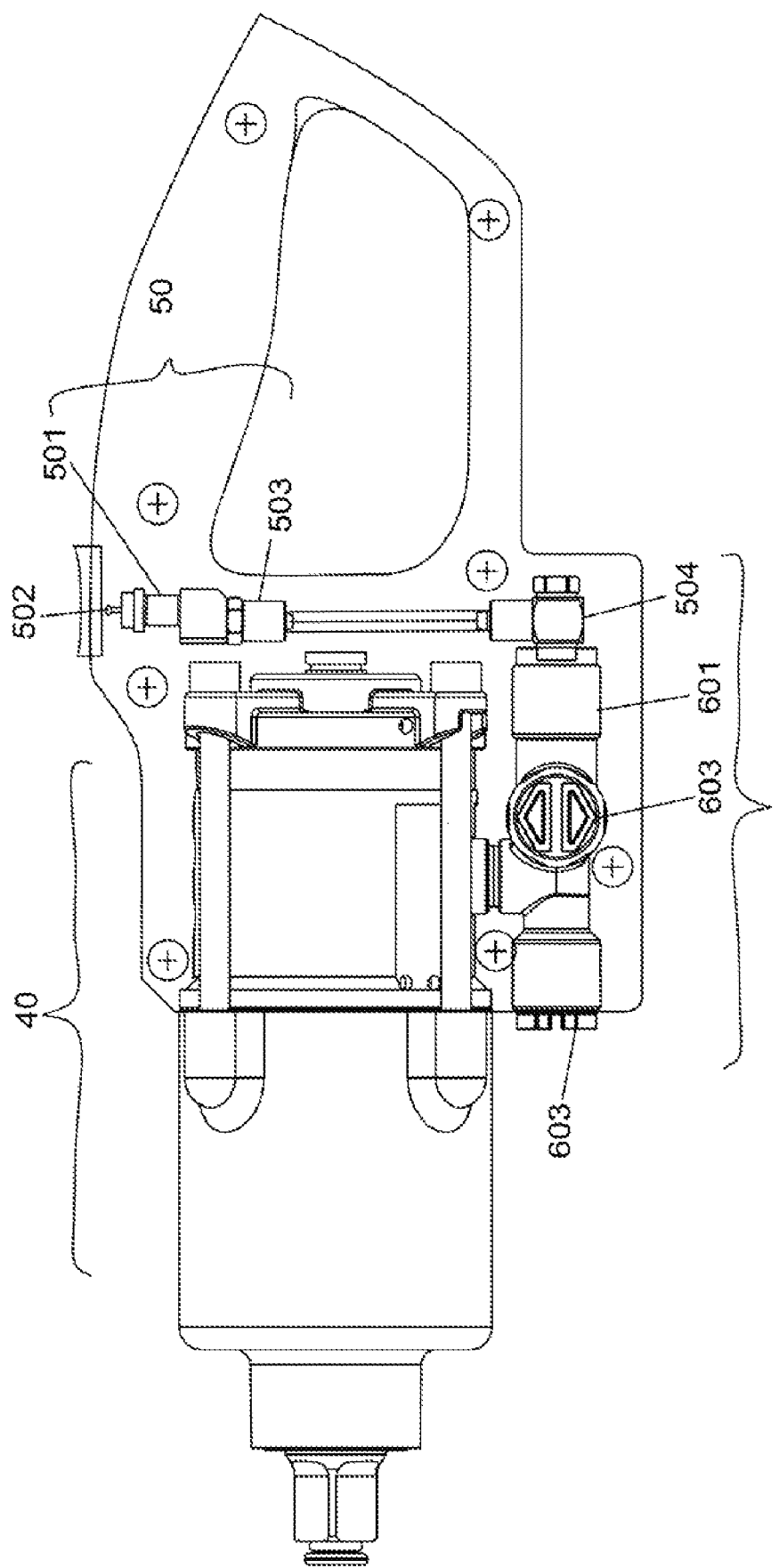
FIG. 10 illustrates a schematic assembled view of the flexibility of the present invention for tool design.

Referring to FIG. 10, which illustrates a schematic view of the flexibility of the present invention for tool design to use the same air actuation module, air inlet module, and air operation module, as shown in FIG. 1, for an air impact wrench with straight type of grip.

Figure 11:
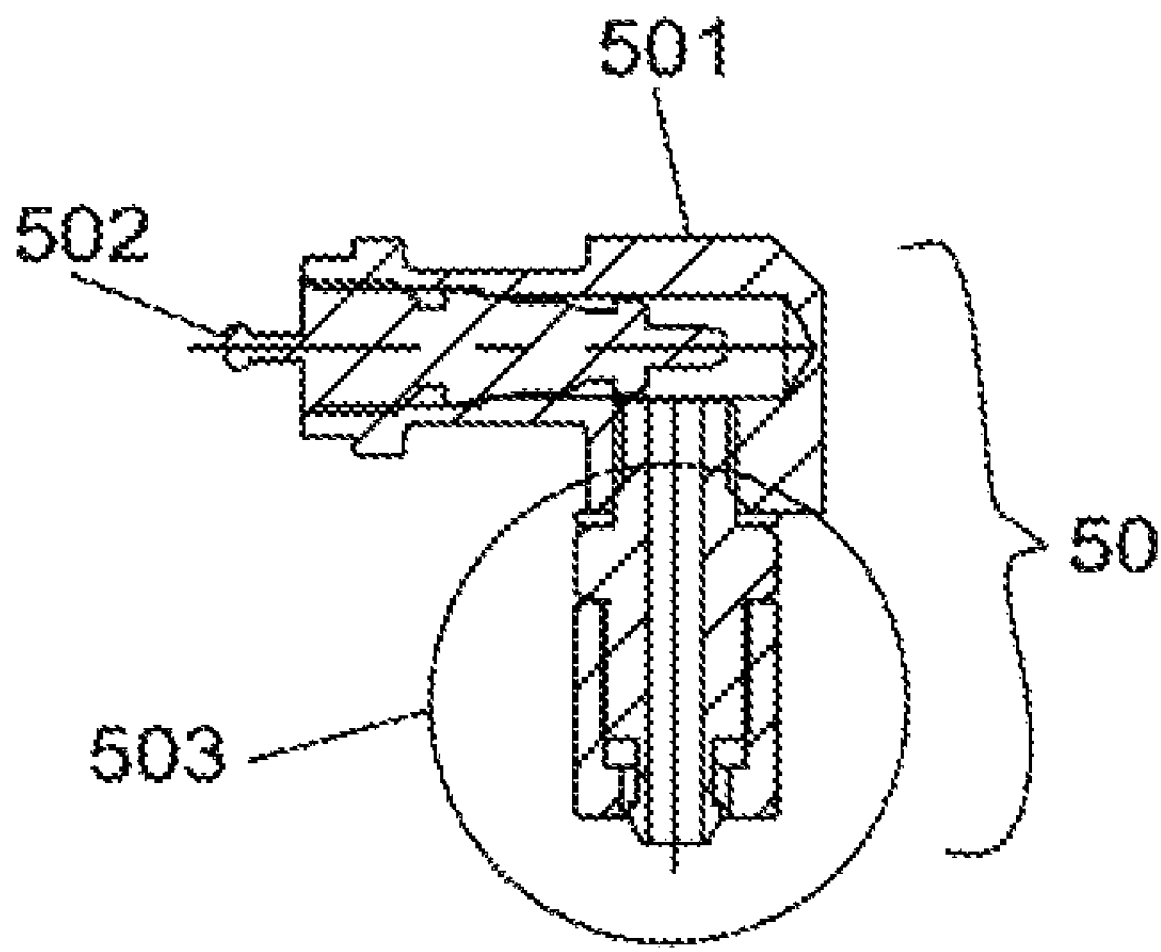
FIG. 11 illustrates a sectional drawing of the structure of the air actuation module applied to the present invention.
Figure 12:
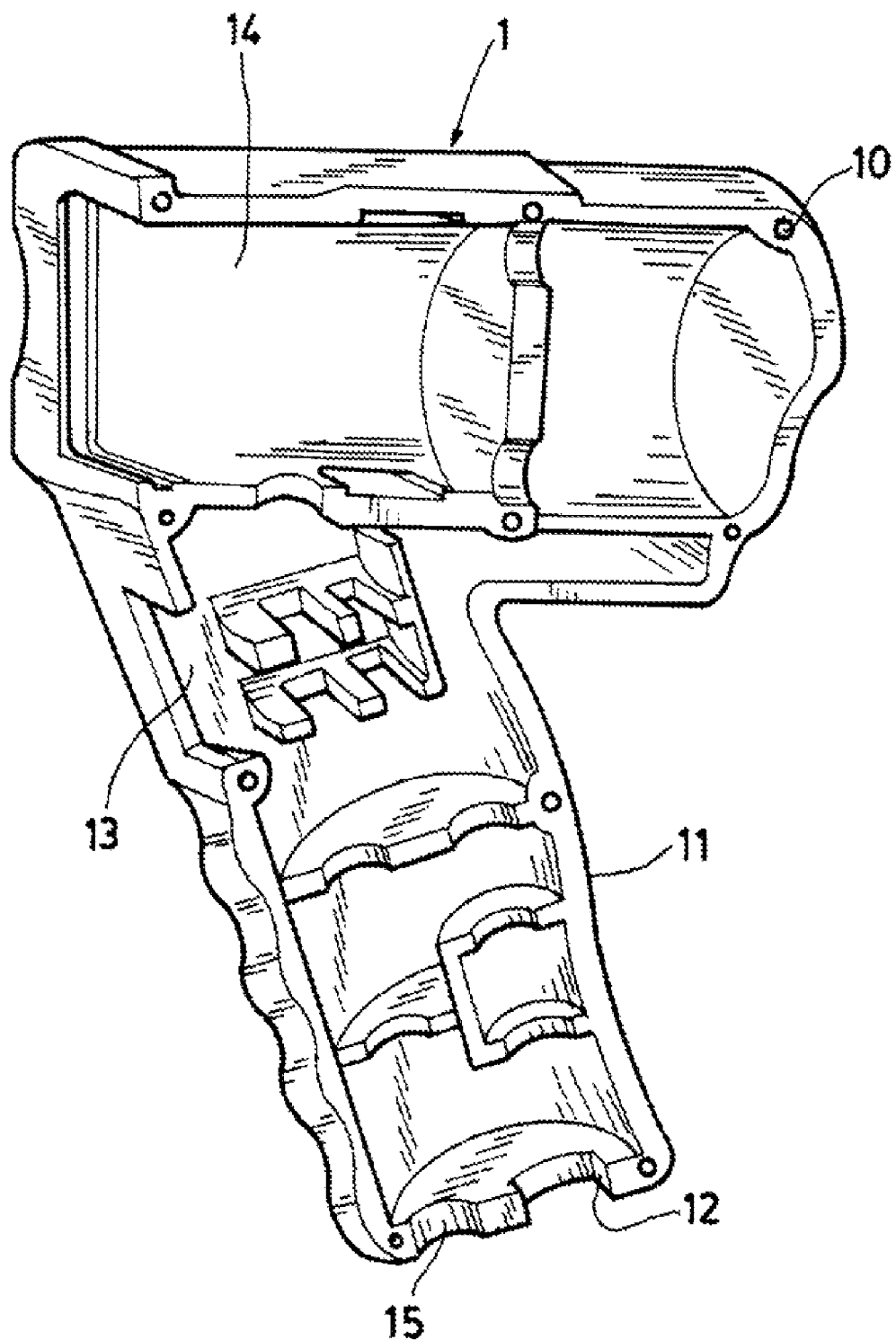
FIG. 12 illustrates a half shell housing of an air impact wrench for retaining the assembly of air inlet module, air actuation module and air operation module shown in FIG. 13.
Figure 13:
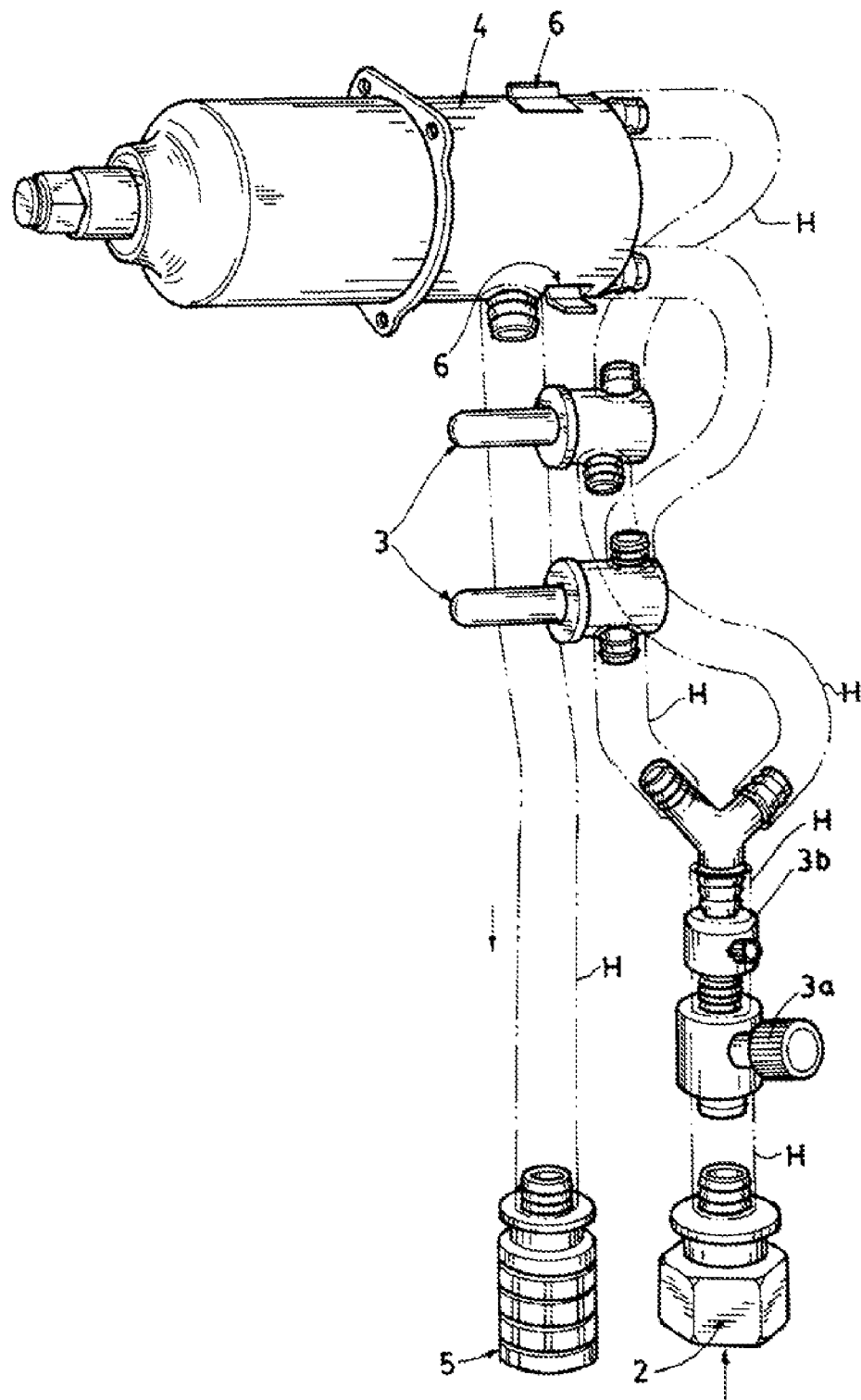
FIG. 13 showing an exploded view of the previous design, which consists of an air inlet valve with an air regulator, a lubricator, a Y-hose connector, and two sets of air actuation valve, connected by several pieces of air hoses in between, two independent air hoses will lead the compressed air into the operation module separately.

Referring to FIG. 11, which illustrates a schematic view of the structure of the air actuation module applied to the present invention. The hose connector 503 is to connect to the hose connector 80 or 80' on the air bleed hole 605 or 605' on the air inlet block 601 or 301 of the air inlet module 60 or 30 by the air bleed hose 71 or 70 shown as in FIGS. 1, 3, 5, 7, and 9. As soon as the air bleed valve 502 depressed by a trigger or button, a micro stream of the compressed air from the valve block 501 will be relieved to the air immediately (such as the function of the bleeding valve on the tire), breaking the static balance condition of the valve stem 602 or 602' inside the air inlet block 601 or 301 of the air inlet module 60 or 30 and force the valve stem 602 or 602' to move backward to the big end "A" or "A'" until the face of the big end "A" or "A'" being against to the plug screw 603 while allowing the compressed air passing by the clearance between the valve stem 602 or 602' and the chamfered throat 612 or 612' of the to bore inside the air inlet block 601 or 301, through the air passage 609 or 609' and the outlet hole 606 or 606', the elastomeric seats 90 or 90' to get into the air hose 73 or 72 and enter the air operation module 40 as shown in FIGS. 16, 17, 18, 19, 20, and 21.

Figure 18:
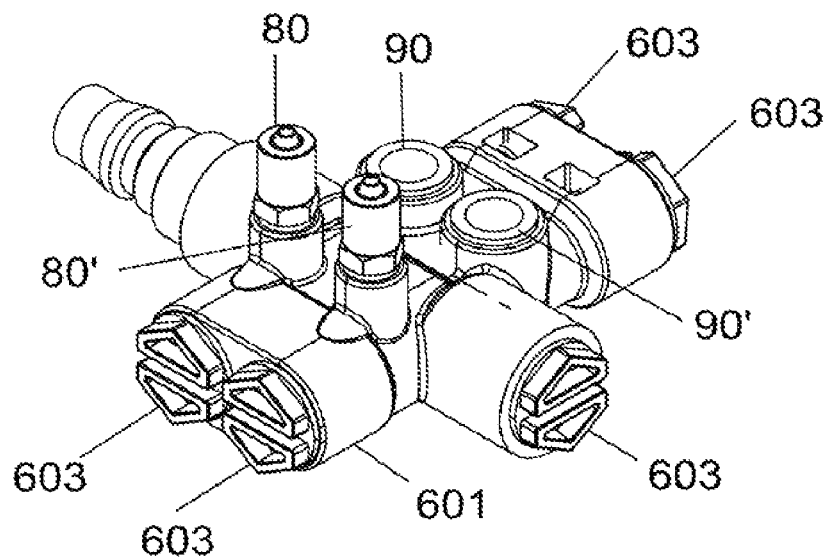
FIG. 18 is a perspective view of an air inlet module with dual valve stem. It composed of an air inlet block, two valve stems, five pieces of plug screw, two hose connectors, and two rubber seats with an air nipple ready for connecting the compressed air.

Further referring to FIG. 15, the compressed air imported from either the air inlet port 604 or 604' through the miniature hole 608 or 608' on the valve stem 602 or 602', enter the room 611 or 611', the air bleed hole 605 or 605' and then through the hose connector 80 or 80' as shown in FIG. 18 and the air bleed hose 71 or 70 as shown in FIG. 1, 3, 5, 7, or 9, and the hose connector 503 on the valve block 501 of the air actuation module 50 or 50', then standing by there and ready for actuation. Before the air bleed valve 502 depressed by a trigger or button for actuation and either end of the air inlet port 604 or 604' hooked up with the compressed air, the valve stem 602 and 602' will be forced forward to the small end "a" until the end "a" being against the plug screw 603 while sealing the air passages 609 and 609' to avoid the compressed air getting into the air operation module 40 through the outlet port 606 or 606'.

The function of the air control module units is further described as follows.

Also as shown in FIG. 15) wherever the valve stem 602 and 602' located before hooking the compressed air, both the valve stems 602 and 602' will be forced to move forward to the small end "a" of the valve stem 602 and 602' due to the fact that the compressed air will get into the room 611 and 611' through the communication hole 610 and the miniature holes 608 and 608' as soon as either end of the air inlet port 604 or 604' hooked up with the compressed air, and the force "f" driven by the compressed air applied to the big end "A" is stronger than the force "f" driven by the compressed air applied to the shoulder end "A1".

Figure 16:
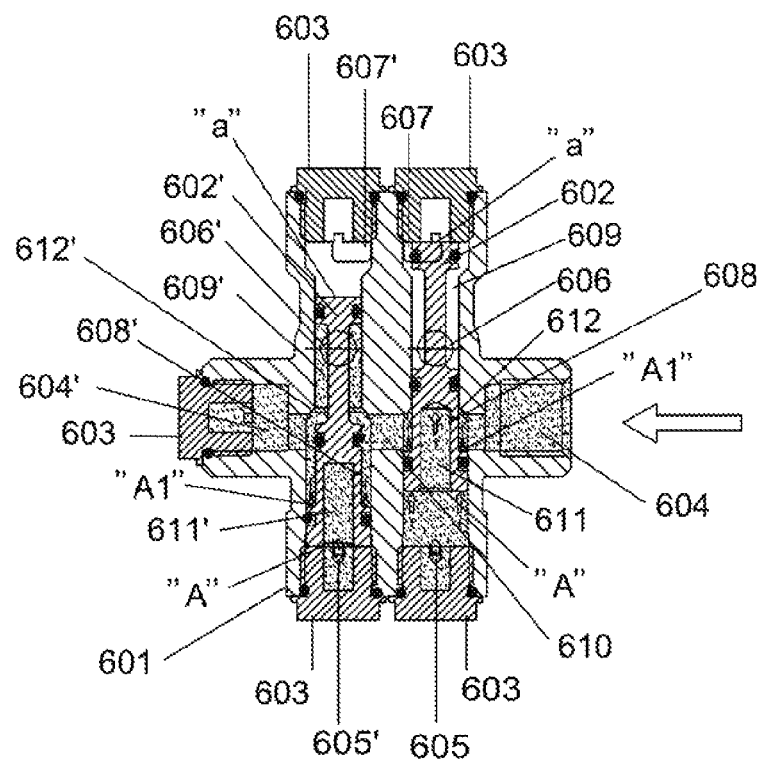
FIGS. 16 and 17 are sectional drawings showing the movement and function of dual valve stem in the air inlet block as soon as one of each correspondent air bleed valve in the air actuation module actuated.

As soon as any of the air bleed valve 502 of the air actuation module 50 or 50' depressed by a button or trigger, a micro stream of compressed air will leak and escape through the air bleed valve 502. The total force applied to the big end "A" will be decreased and become weaker than the total force applied to the shoulder end "A1". It will make the correspondent valve stem 602 or 602' moved backward to big end "A" immediately till against the plug screw 603 while the main stream of compressed air will pass by the clearance between the valve stem 602 or 602' and the chamfered throat 612 or 612' of the bore inside the air inlet block 601 or 301' the passage 609 or 609' and through the outlet hole 606 or 606', the elastomeric seats 90 or 90', the air hose 73 or 72, and enter the operation module 40 as shown in FIGS. 16, 17, and 18.

Figure 17:
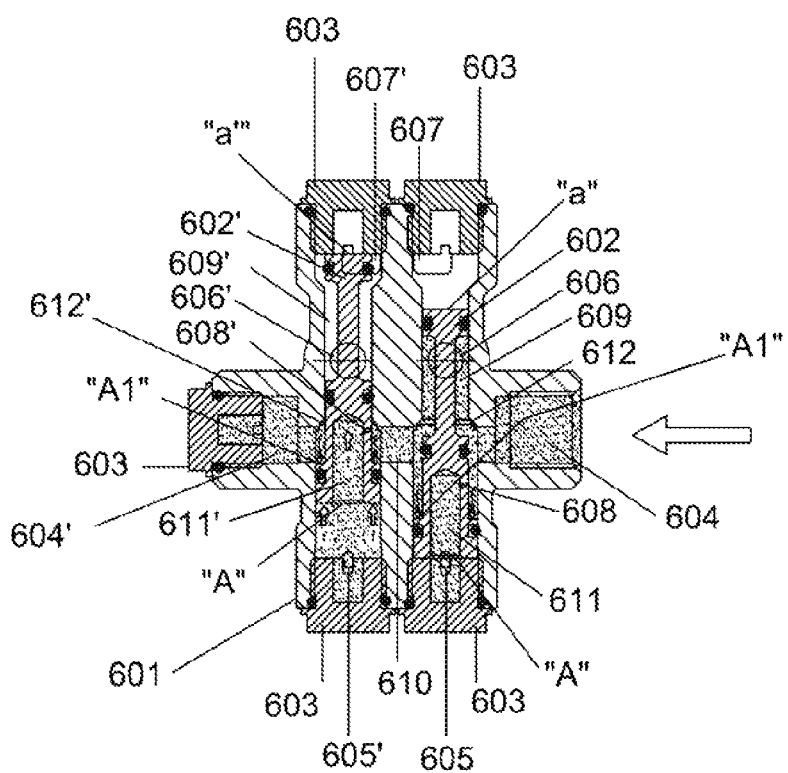

Further referring to FIG. 17 and FIG. 1, as soon as the air bleed valve 502 of the air actuation module 50 actuated by the button, a micro stream of compressed air will escape through the air bleed hole 605 on the air inlet block 601, the hose connector 80, the air bleed hose 71, the hose connector 503, the air bleed valve 502, and then to the air. The valve stem 602 will be forced to move to the big end "A" against the plug screw 603 immediately. It is important to be noted that a certain volume of exhausted air from the air motor will go through the air hose 72, the air outlet port 606' on the air inlet block 601, the air passage 609' between the valve stem 602' and the bore of the air inlet block 601, and finally the exhaust hole 607' on the air inlet block 601 to the air. Referring to FIG. 16 & FIG. 1, as soon as the air bleed valve 502' of the air actuation module 50' actuated by the button, A micro stream of compressed air will escape through the air bleed hole 605' on the air inlet block 601, the hose connector 80', the air bleed hose 70, the hose connector 503', and the air bleed valve 502' to the air. The valve stem 602' will be forced to move to the big end "A" against the plug screw 603 immediately. It is the same function as above that a certain volume of exhausted air from the air motor will go through the air hose 73, the air outlet port 606 on the air inlet block 601, the air passage 609 between the valve stem 602 and the bore of the air inlet block 601, and finally the exhaust hole 607 on the air inlet block 601 to the air. This function will help the air motor to exhaust sufficient air during continuous compression to the motor vanes in order to drive the rotor efficiently. It's always required by reversible type of air tools such as air impact wrench, reversible air drill, air screwdrivers, air rivet nut setting tools, etc. to ensure the output torque to be delivered effectively.

Figure 19:
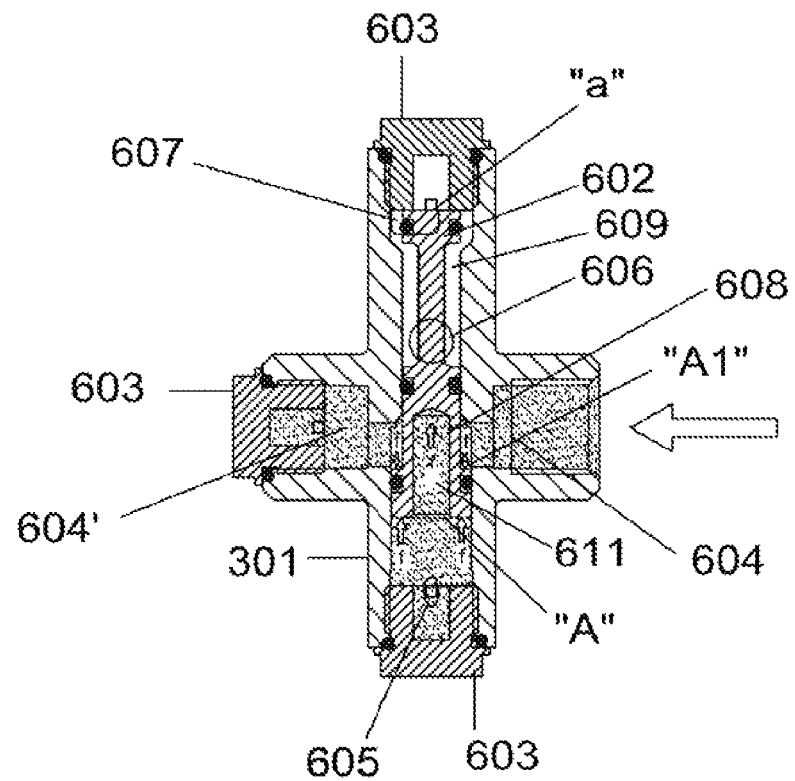
FIG. 19 is a sectional drawing of an air inlet module with single valve stem of the present design, showing the location of the valve stem in the air inlet block under static condition while the air inlet port of the air inlet block hooked up to the compressed air.

Referring to FIG. 19, which is a static state of the air inlet module 30 with the single valve stem 602 in the air inlet block 301 as soon as either side of the air inlet port 604 or 604' hook up the compressed air. The compressed air will enter the room 611 through the miniature hole 608 and fill the air inlet ports 604, 604' and the room 611 saturated by the compressed air. The force applied to the big end "A" of the valve stem 602 is stronger than the force applied to the shoulder end "A1" driven by the compressed air. The valve stem 602 is then forced to move forward to the small end "a" till against the plug screw 603. This is the static state of the air inlet module 30 with the compressed air hooked up and before the air actuation module is actuated.

Figure 20:
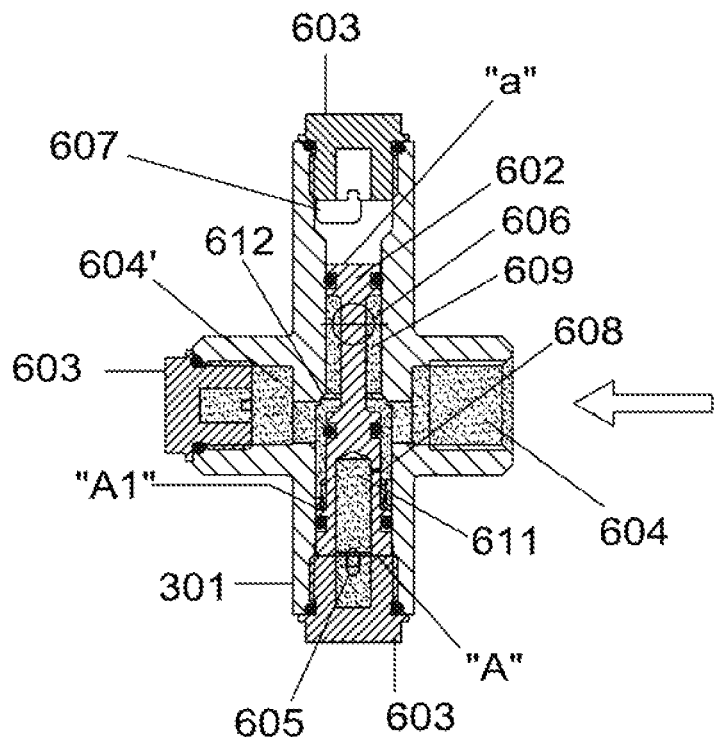
FIGS. 20 and 21 are sectional drawings showing the movement and function of the single valve stem in the air inlet block as soon as the correspondent air bleed valve in the air actuation module actuated.
Figure 21:
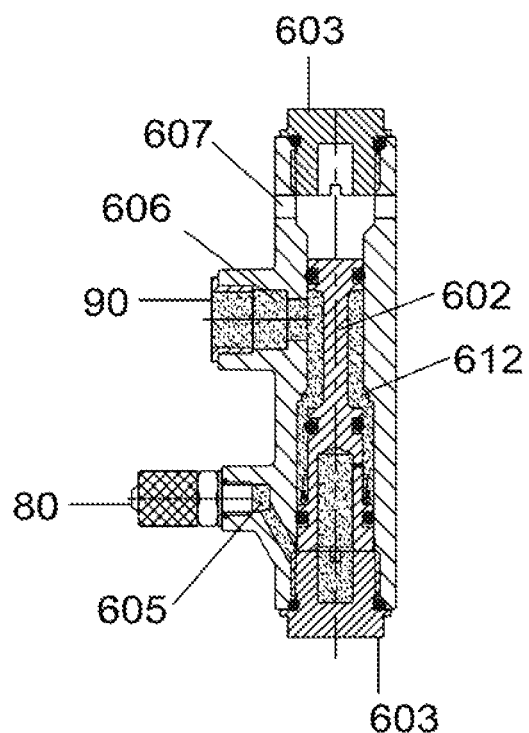
Figure 22:
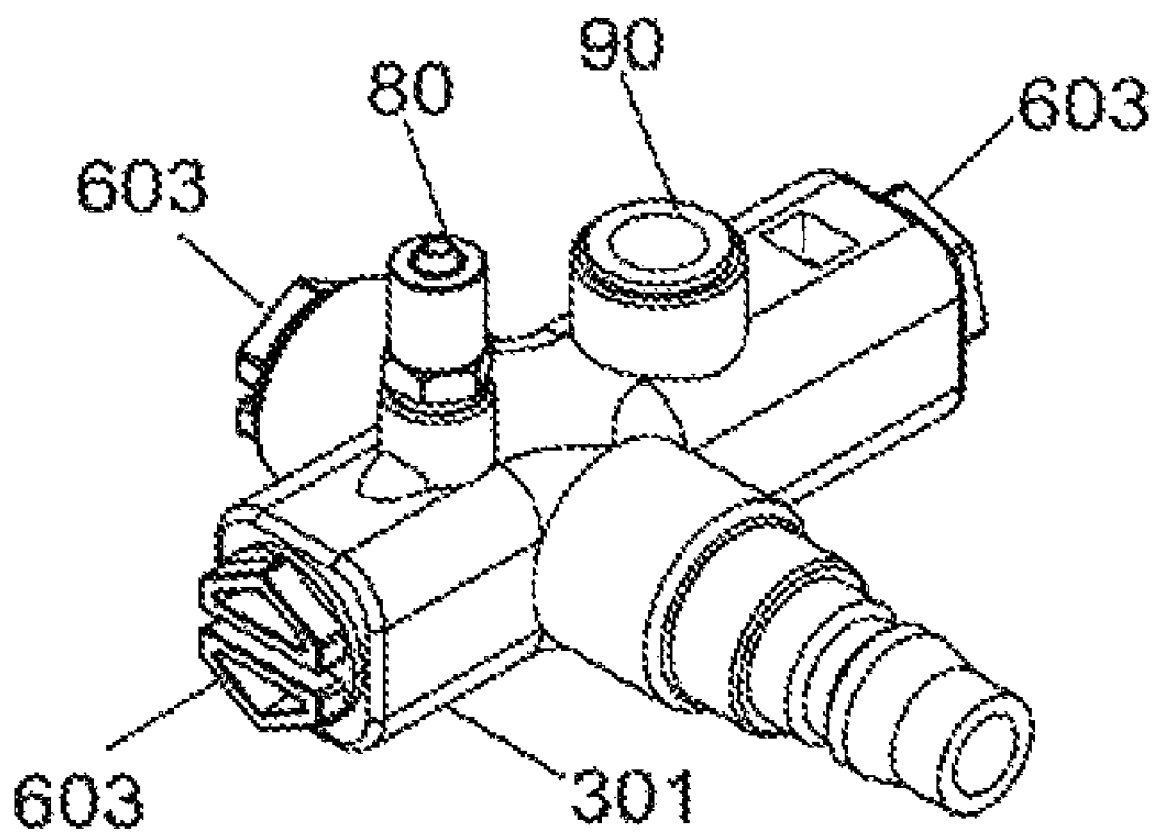
FIG. 22 is a perspective view of an air inlet module with single valve stem and composed of an air inlet block, one valve stem, three plug screws, one piece of a hose connector and rubber seat with an air nipple ready for connecting the air hoses.

Referring to FIGS. 20, 21, and 22, as soon as the air bleed valve 502 of the air actuation module 50 being depressed by a press element, a micro stream of compressed air will leak and escape through the air bleed valve 502 in the valve block 501 and force the valve stem 602 to move backward to the big end "A" tilt against the plug screw 603 while the main stream of compressed air passing by the clearance between the valve stem 602 and the chamfered throat 612 of the bore inside the air inlet block 301 the air passage 609 and through the outlet hole 606, the elastomeric seats 90, the air hose 73, and enter the air operation module 40, as shown in FIGS. 3, 4, 7, 8, and 9. It is the same function as either of the valve stem 602 or 602' in the air inlet module 60 actuated by each of the correspondent air actuation module 50 or 50', as shown in FIG. 16 and FIG. 17.

Figure 14:
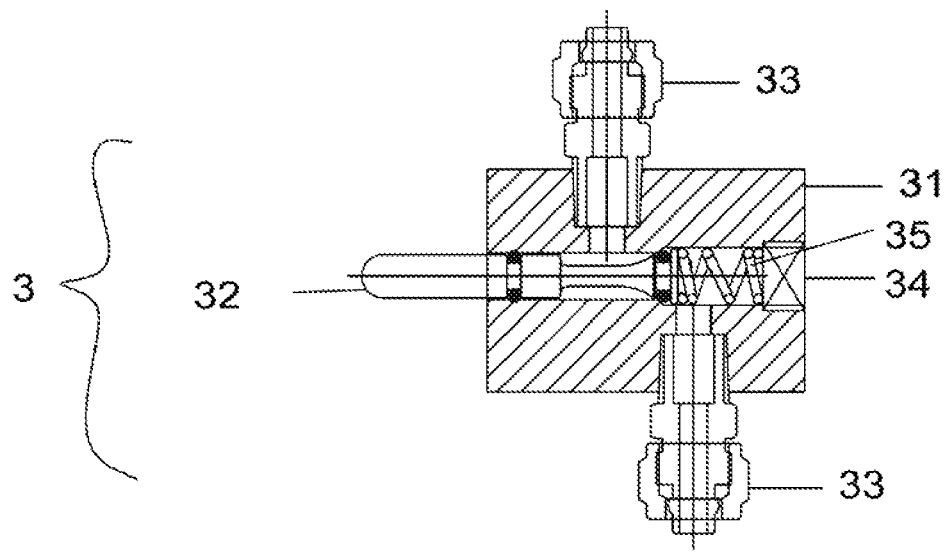
FIG. 14 is a sectional drawing showing an air actuation valve of the prior art, and the air actuation valve consists of a valve block, a valve stem, two hose connectors, one spring, and one plug screw, in order to allow sufficient flow of compressed air passing by and enter the operation module, the prior art cannot be minimized to ideal compact dimensions to to meet the satisfaction and comfort of the hand held housing design.

Referring to FIG. 11 and FIG. 14, the air actuation valve 3 must be big enough to allow sufficient compressed air flow through to the air operation module 4. Since the valve stem 32 actuated by the trigger or button at the hand held portion of the shell housing cannot be arranged and relocated to other portion inside the housing and it cannot be minimized to ideal compact dimensions to meet the satisfaction and comfort of the hand held housing design. Furthermore, for reversible type air motors, there are two air inlet ports and one air exhaust hole for introducing compressed air in and out while rotating clockwise or counterclockwise. Since the air exhaust hole on the air motor cannot be enlarged big enough for exhausting the air after compression sufficiently, one of the other air inlet holes on the air motor and correspondent air inlet passage should be a complementary exhaust air passage to the air for the best performance of the air motor output. The air actuation valve 3 is not designed with this function and there is no other alternatives to make a compact size of two (dual) way air control valve with the function for controlling air inlet with one actuation valve while having the other valve act as a complementary exhaust air passage simultaneously. The added values of the present invention can be obtained as follows.

It is easily to change the plug screw 603 from one air inlet port 604 or 604' to another for the convenience of right or left handed operators while using a portable pneumatic tool.

Figure 23:
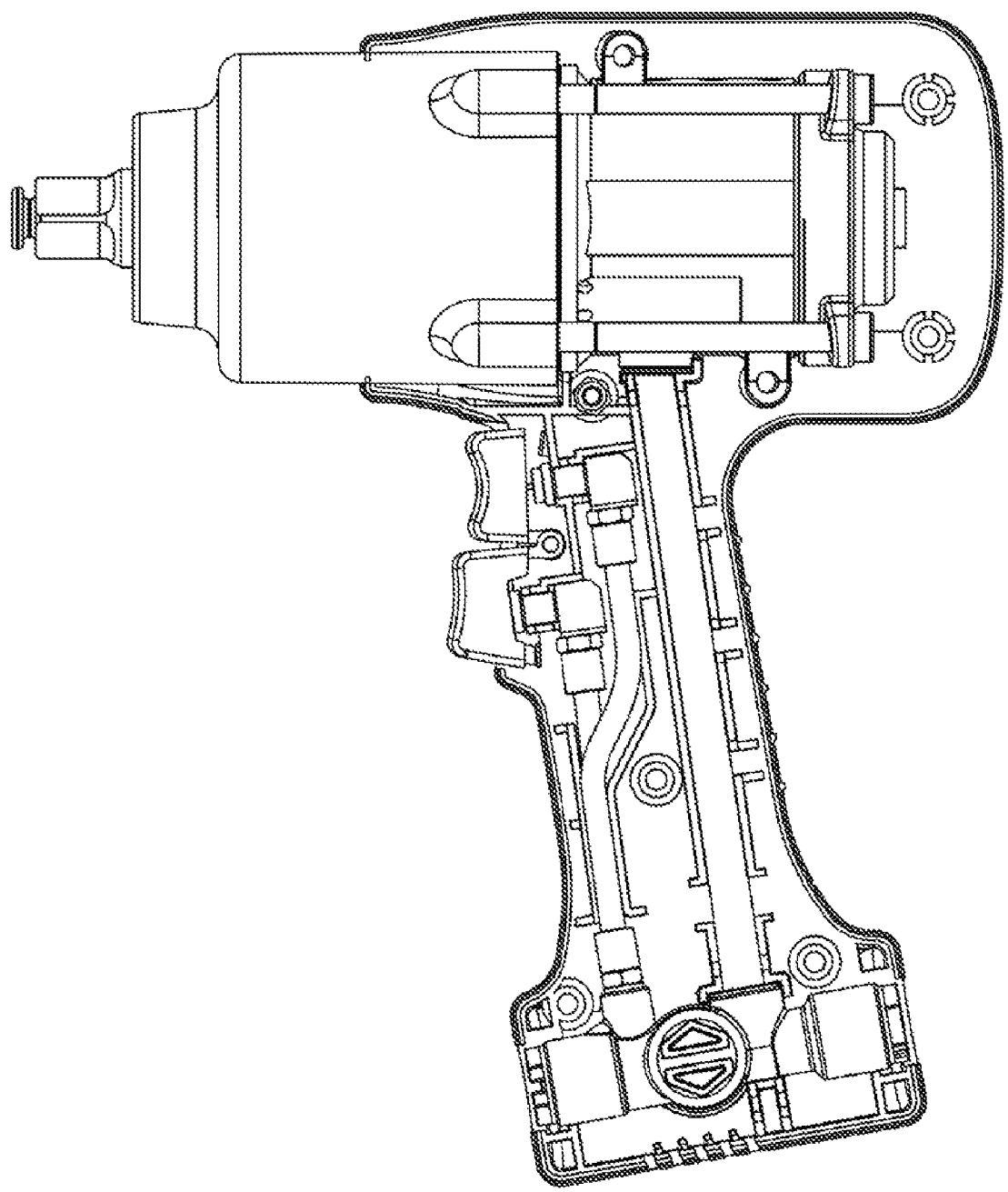
FIG. 23 illustrates a schematic view of a half shell housing of the portable pneumatic tool of the present invention.

With reference to FIG. 23, which illustrates a schematic view of a half shell housing for the assembly of the portable pneumatic tool of the present invention. That is, the housing of the portable pneumatic tool can be shaped as two symmetrical half shells as well, and they are combined each other to be a whole housing.

The present invention provides great flexibility and interchangeability of components for the air tool design especially the air control module units among various types of portable air tools shown as FIGS. 1, 2, 3, 4, 5, 6, 7, 8, 9, and 10.

It makes the portable air tool design with more flexibility, and make the portable air tool feasibly to be integrated with proper selected electronic or electro-mechanical devices for more function requirements such as torque, force, speed, and air pressure sensors with digital display and even a detachable LED lightening cassette or an electronic audible device for warning the operators with audible cautions while using the tool as soon as the tool hooked up with the compressed air, the portable air tool design with such flexibility shows that it is feasible and easy to have air hoses and electric or signal wires connected with all relevant modules and retained in the half shell housing for various kinds of functions required. It not only solves the drawbacks of the prior at but also makes it really feasible to be applied to most of the portable pneumatic tools designed with module unit concept and retained in half shell housings to meet operators satisfaction, easy for assembling and disassembling in service, more comfort and maneuverable in operation, enable private brand tool manufacturers build their own identity in different market segments to get rid of the keen competition of the flood "ME-TOO" products Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An air control module unit for a portable pneumatic tool having an air actuation module comprising:

an air inlet module, which has at least one valve stem inside an air inlet block, the air inlet block having plug screws on both ends towards the valve stem and one plug screw in the intersectional direction of the valve stem with at least one air inlet port opening for hooking up the compressed air;

an air actuation module having an air bleed valve inside a valve block;

a plurality of flexible air hoses with a plurality of dimensions and being prepared for connecting the air inlet module and air actuation module; and a plurality of hose connectors and elastomeric seats with a plurality of types for connecting the air inlet module and air operation module.

2. The air control module unit according to claim 1, wherein said air inlet module comprises: an air inlet block with at least one valve stem with O-Ring seals inside the bore of the air inlet block and plug screws towards both ends of the valve stem for sealing; and at least one air inlet port at intersectional direction of the valve stem for connecting the compressed air.

3. The air control module unit according to claim 1, wherein said air inlet module can be built with at least one valve stem to communicate with a correspondent air actuation module and air operation module for various functional requirements.

4. The air control module unit according to claim 1, wherein said air inlet module can be built with at least one air inlet port around the intersectional direction of the valve stem in the air inlet block while only leaving one air inlet port for connecting compressed air and have the rest of air inlet ports sealed with plug screws.

5. The air control module unit according to claim 1 wherein said air inlet module can be built with every inlet and outlet holes around the air inlet block at the intersectional direction of the valve stem.

6. The air control module unit according to claim 1, wherein said the air actuation module comprises: a valve block, an air bleed valves and a set of hose connectors, the air bleed valve is actuated by a press element to let the micro stream of compressed air escape and makes the valve stem inside the air inlet block move backward to hit the plug screw to allow the compressed air get into an air actuation module directly, at least one air bleed valve to communicate with the correspondent valve stem to be actuated in the air inlet block.

7. The air control module unit according to claim 1, wherein said the elastomeric seats are made of rubber.

* * * * *